(12) United States Patent
Harada (10) Patent No.: US 7,362,364 B2
(45) Date of Patent: Apr. 22, 2008

(54) SOLID-STATE IMAGE PICKUP DEVICE WITH PHOTOELECTRIC CHARGE TRANSFERRER TO A FLOATING DIFFUSION REGION

(75) Inventor: Kouichi Harada, Kanagawa (JP)

(73) Assignee: Sony Corporation (JP)

( * ) Notice: Subject to any disclaimer, the term of this patent is extended or adjusted under 35 U.S.C. 154(b) by 720 days.

(21) Appl. No.: 10/926,058

(22) Filed: Aug. 26, 2004

(65) Prior Publication Data

US 2005/0046721 A1 Mar. 3, 2005

(30) Foreign Application Priority Data

Sep. 3, 2003 (JP) .......................... P2003-311302

(51) Int. Cl.
*H04N 3/14* (2006.01)
*H04N 1/46* (2006.01)
*H01L 27/148* (2006.01)
*H01L 31/062* (2006.01)
*H01L 27/00* (2006.01)

(52) U.S. Cl. ...................... 348/300; 348/311; 257/239; 257/290; 250/208.1; 358/513

(58) Field of Classification Search ................ 348/300, 348/311; 257/239, 290; 250/208.1; 358/513
See application file for complete search history.

(56) References Cited

U.S. PATENT DOCUMENTS

| | | | | |
|---|---|---|---|---|
| RE31,612 E | * | 6/1984 | Sauer | .......................... 257/239 |
| 5,160,899 A | * | 11/1992 | Anderson et al. | .... 257/E27.016 |
| 5,821,998 A | * | 10/1998 | Murakami et al. | .......... 348/300 |
| 5,898,332 A | * | 4/1999 | Lefevre | ................. 348/E3.023 |
| 6,510,193 B1 | * | 1/2003 | Kochi et al. | ................. 257/239 |
| 6,642,792 B2 | * | 11/2003 | Takeuchi et al. | ............. 330/257 |
| 6,777,660 B1 | * | 8/2004 | Lee | .......................... 250/208.1 |
| 7,183,555 B2 | * | 2/2007 | Jarron | .................... 250/370.01 |
| 2003/0214688 A1 | * | 11/2003 | Koseki et al. | .............. 358/513 |

FOREIGN PATENT DOCUMENTS

| | | |
|---|---|---|
| CH | 692074 A5 | 1/2002 |
| JP | 10-117306 | 5/1998 |
| JP | 11-234567 | 8/1999 |

* cited by examiner

*Primary Examiner*—David Ometz
*Assistant Examiner*—Nhan T. Tran
(74) *Attorney, Agent, or Firm*—Rader Fishman & Grauer PLLC; Ronald P. Kananen (57) ABSTRACT

A solid-state image pickup device including a charge transferrer to transfer a signal charge obtained through photoelectric conversion; a floating diffusion region; a reset means for resetting the potential of the floating diffusion region; and a current source for supplying, to the floating diffusion region, a signal charge corresponding to the quantity of the signal charge transferred by the charge transferrer. The current source such as a current mirror circuit is interposed between the output stage of a horizontal CCD and the floating diffusion region so as to supply thereto a signal charge corresponding to the quantity of the signal charge transferred by the horizontal CCD, hence separating the horizontal CCD and the floating diffusion region potentially from each other, whereby the supply voltage, i.e., the reset voltage for the floating diffusion region, can be set independently of the potential of the horizontal CCD.

9 Claims, 8 Drawing Sheets

SOLID-STATE IMAGE PICKUP DEVICE WITH PHOTOELECTRIC CHARGE TRANSFERRER TO A FLOATING DIFFUSION REGION

BACKGROUND OF THE INVENTION

The present invention relates to a solid-state image pickup device and, more particularly, to an output circuit of a solid-state image pickup device wherein a signal charge obtained in each light receiving element through photoelectric conversion is transferred by a charge transferrer and then is outputted after conversion into a corresponding signal voltage.

It is known that for the purpose of reducing the power consumption in a solid-state image pickup device, an output buffer in an output circuit to convert a signal charge into a corresponding signal voltage and to output the same therefrom includes plural cascade-connected stages of source follower circuits, wherein respective supply voltages to the source follower circuits are set to be mutually different in such a manner that the greater the DC current flowing in each source follower circuit, the lower the supply voltage to each of the plural stages of the source follower circuits (see Cited Patent Document 1, for example).

In another known structure of an output buffer in a solid-state image pickup device where source follower circuits are cascade-connected in plural stages, the last-stage source follower circuit consists of a push-pull circuit to thereby reduce the power consumption (see Cited Patent Document 2, for example).

Cited Patent Document 1:
Japanese Patent Specification No. 3351503 (in particular, FIG. 2 and Paragraphs 0037 and 0038)

Cited Patent Document 2:
Japanese Patent Laid-open No. Hei 11-234567 (in particular, FIG. 1 and Paragraph 0021)

In the related art described in Cited Patent Document 1, the output voltage value needs to be lowered in the source follower circuit of each stage, so that it becomes necessary to increase the threshold voltage Vth of a MOS transistor constituting each source follower circuit. Viewing an example of lowering the output voltage value from 15 V or so to 3 V or so, in the case of an output buffer where three stages of source follower circuits are cascade-connected, the gate-source voltage Vgs of the source follower circuit in each stage needs to be set to a high value of 4 V or so. As a result, there arises a problem that the gain of the source follower circuit is lowered due to the substrate bias effect to eventually deteriorate the sensitivity.

Meanwhile according to the related art described in Cited Patent Document 2, in an example of an output buffer where three stages of source follower circuits are cascade-connected similarly to the foregoing case mentioned above, a depletion-mode Pch MOS transistor of which the threshold voltage Vth is 4 V or so needs to be produced for lowering the output voltage value to 4 V or so by the use of the third-stage push-pull circuit. However, since it is difficult to produce a depletion-mode Pch MOS transistor whose threshold voltage Vth is 4 V or so, the output voltage value needs to be lowered from 15 V or so to 3 V or so in the first-stage and second-stage source follower circuits. For this purpose, the gate-source voltage Vgs in each of the first-stage and second-stage source follower circuits needs to be set to 6 V or so, hence raising another problem that the gain of each source follower circuit is further impaired due to the substrate bias effect.

SUMMARY OF THE INVENTION

The present invention has been accomplished in view of the problems mentioned above. And, it is an object of the invention to provide a solid-state image pickup device adapted to realize a reduction of the power consumption without deteriorating the conversion efficiency or the frequency characteristic thereof.

According to one aspect of the present invention, there is provided a solid-state image pickup device which includes a charge transferrer for transferring a signal charge obtained through photoelectric conversion; a floating diffusion region; reset means for resetting the potential of the floating diffusion region; and a current source for supplying a signal voltage corresponding to the quantity of electric charge for the signal charge transferred by the charge transferrer to the floating diffusion area.

In the solid-state image pickup device having the above structure, the current source is interposed between the charge transferrer and the floating diffusion region, so that the current source potentially separates the charge transferrer and the floating diffusion region from each other, whereby the reset voltage for the floating diffusion region can be set independently of the potential of the charge transferrer.

Thus, according to the present invention, the reset voltage for the floating diffusion region is settable independently of the potential of the charge transferrer, so that the reset voltage for the floating diffusion region can be lowered to consequently reduce the power consumption in the solid-state image pickup device without deteriorating the conversion efficiency or the frequency characteristic thereof.

DESCRIPTION OF THE PREFERRED EMBODIMENTS

Hereinafter, some preferred embodiments of the present invention will be described in detail with reference to the accompanying drawings. In the embodiments, an explanation will be given on an exemplary case of applying the invention to a solid-state image pickup device which adopts an interline transfer system, for example. However, the present invention is not limited thereto alone, and it may be applied also to any solid-state image pickup device adopting some other transfer system, such as a frame interline transfer system.

Figure 1:
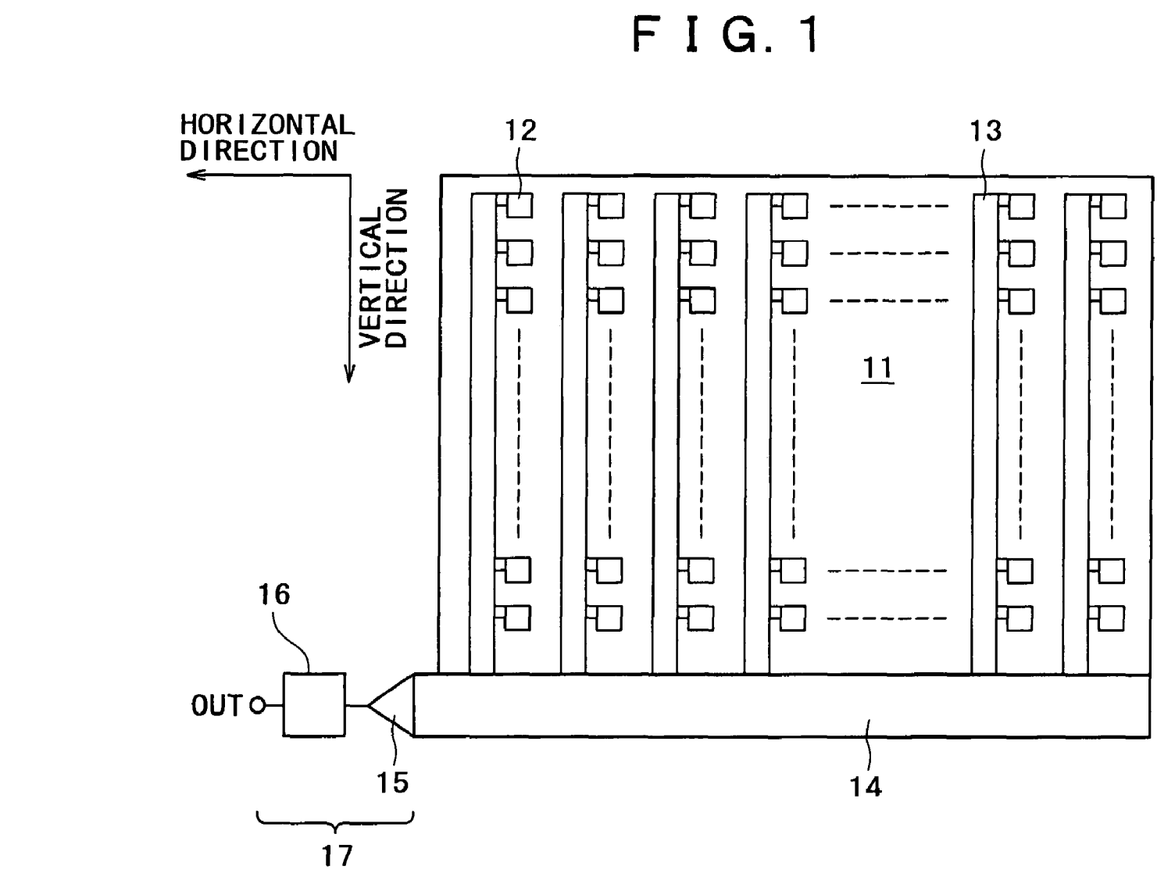
FIG. 1 is a block diagram schematically showing the whole structure of a CCD type solid-state image pickup device according to one embodiment of the present invention.

FIG. 1 is a block diagram schematically showing the whole structure of a solid-state image pickup device, e.g., a CCD (Charge Coupled Device) type solid-state image pickup device according to an embodiment of the present invention. In FIG. 1, a charge detector 15 and an output buffer 16 constituting an output circuit 17 are formed integrally, in combination with an image sensor 11 and a horizontal CCD (horizontal transferrer) 14, on an N-type semiconductor substrate (not shown), for example.

The image sensor 11 includes light receiving elements (pixels) 12 consisting of, e.g., photodiodes that are arrayed two-dimensionally in rows and columns like a matrix and execute photoelectric conversion of the received light into a signal charge of a quantity corresponding to that of the light and vertical CCDs (vertical transferrers) 13 each disposed per vertical pixel column in the pixel array of the light receiving elements 12 and transferring vertically the signal charges read out from the light receiving elements 12.

The signal charge (here, electron) transferred by each of the vertical CCDs 13 is transferred in a unit of row (unit of line) from the image sensor 11 to the horizontal CCD 14. The horizontal CCD 14 transfers horizontally the signal charges of one row obtained from the image sensor 11 and then supplies the signal charges sequentially to the charge detector 15 disposed at the end toward a transfer output. The charge detector 15 is a characteristic part of the present invention, and its concrete structure and the detailed operation thereof will be described later. The output buffer 16 executes an impedance conversion of the signal voltage converted from the signal charge in the charge detector 15 and then outputs the converted signal voltage.

First Circuit Example

Figure 2:
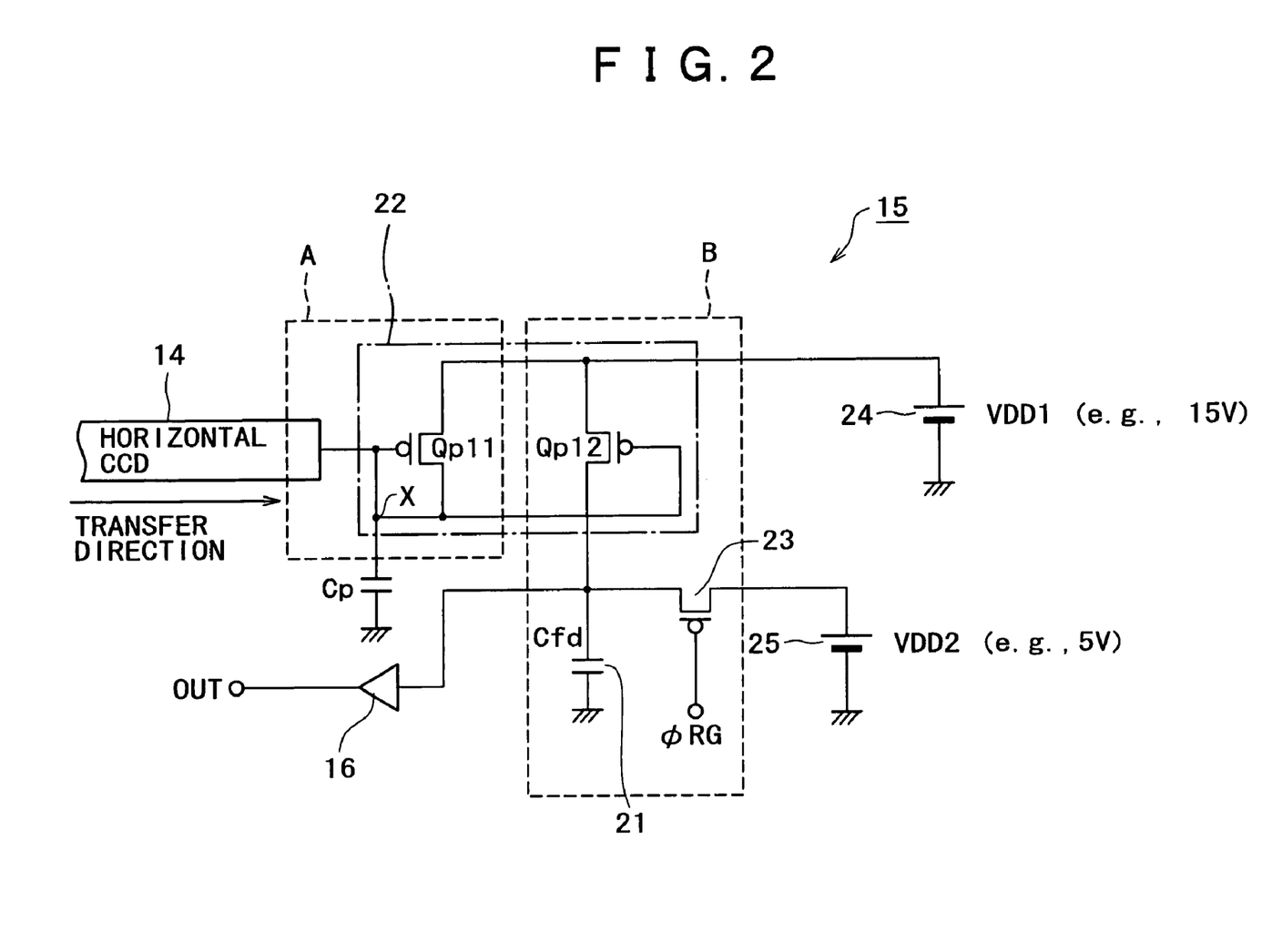
FIG. 2 is a circuit diagram showing a first circuit example with regard to a charge detector and peripheral portions thereof.

FIG. 2 is a circuit diagram showing a first circuit example with regard to the charge detector 15 and its peripheral portions. In FIG. 2, the charge detector 15 in this circuit example has a floating diffusion (FD) region 21; a current source such as, e.g., a current mirror circuit 22 for supplying the signal charge, which corresponds to the quantity of electric charge for the signal charge transferred by the horizontal CCD 14, to the floating diffusion region 21; and a reset transistor 23 for resetting the floating diffusion region 21.

The current mirror circuit 22 consists of a Pch MOS transistor Qp11 and a Pch MOS transistor Qp12. The gate and drain of the Pch MOS transistor Qp11 are connected in common to each other while being connected to one terminal of a parasitic capacitance Cp for temporarily storing the signal charge transferred by the horizontal CCD 14, and the source thereof is connected to the positive terminal of a DC power supply 24 for a first supply voltage VDD1 (e.g., 15 V). The gate of the Pch MOS transistor Q12 is connected in common to that of the MOS transistor Qp11, while the source thereof is connected to the positive terminal of the DC power supply 24, and the drain thereof is connected to the floating diffusion region 21.

In this current mirror circuit 22, a parasitic capacitance Cp is incidental to the input terminal of the current mirror circuit 22, i.e., to the gate of the MOS transistor Qp11, as shown in FIG. 2. Therefore, in order to avoid deterioration of the conversion efficiency and the frequency characteristic, the operating points of the MOS transistors Qp11 and Qp12 constituting the current mirror circuit 22 are so set that these MOS transistors Qp11 and Qp12 operate in respective subthreshold regions. More specifically, the channel width W of each of the MOS transistors Qp11 and Qp12 is widened.

The reset transistor 23 consists of a Pch MOS transistor Qp whose drain is connected to the positive terminal of a DC power supply 25 for a second supply voltage VDD2 (e.g., 5 V) lower than the first supply voltage VDD1 and whose source is connected to the floating diffusion region 21. Reset gate pulses φRG are impressed to the gate of the reset transistor 23 in a predetermined cycle. The output buffer 16 operates on the power of the second supply voltage VDD2.

Figure 3:
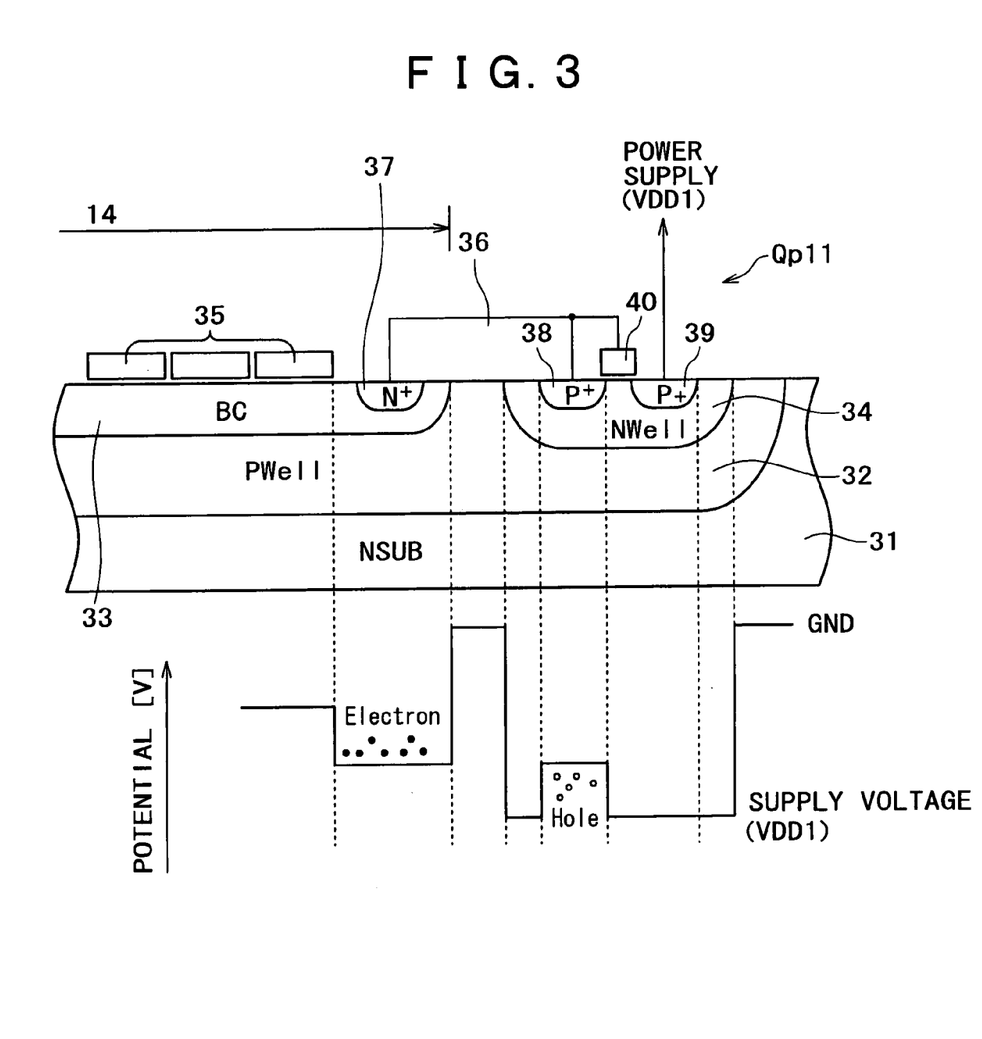
FIG. 3 is a sectional view showing the structure of an area A enclosed with a dotted line in FIG. 2.

FIG. 3 is a sectional view showing the structure of an area A enclosed with a dotted line in FIG. 2, i.e., the output part of the horizontal CCD 14 and the MOS transistor Qp11 constituting the current mirror circuit 22.

In FIG. 3, a transfer channel 33 of the horizontal CCD 14 is formed in the surface layer of a P type well region 32 formed on an N type semiconductor substrate 31 for example, and also an N type well region 34 is formed thereon. The transfer channel 33 constitutes the horizontal CCD 14 in combination with a transfer electrode 35 formed via a gate insulator film (not shown) over the substrate surface. Also, an N+ type impurity region 37 for making electric contact with a metal wiring 36 is formed in the output stage of the transfer channel 33.

Meanwhile in the surface layer of the N type well region 34, there are formed a P+ type impurity region 38 to serve as a drain region and a P+ type impurity region 39 to serve as a source region. These regions 38 and 39 constitute the Pch MOS transistor QP11 in combination with a gate electrode 40 formed via a gate insulator film (not shown) over a channel region between the two regions 38 and 39. The gate electrode 40 is connected to the P+ type impurity region 38 via the metal wiring 36 while being connected also to the N+ type impurity region 37 in the output stage of the horizontal CCD 14.

Figure 4:
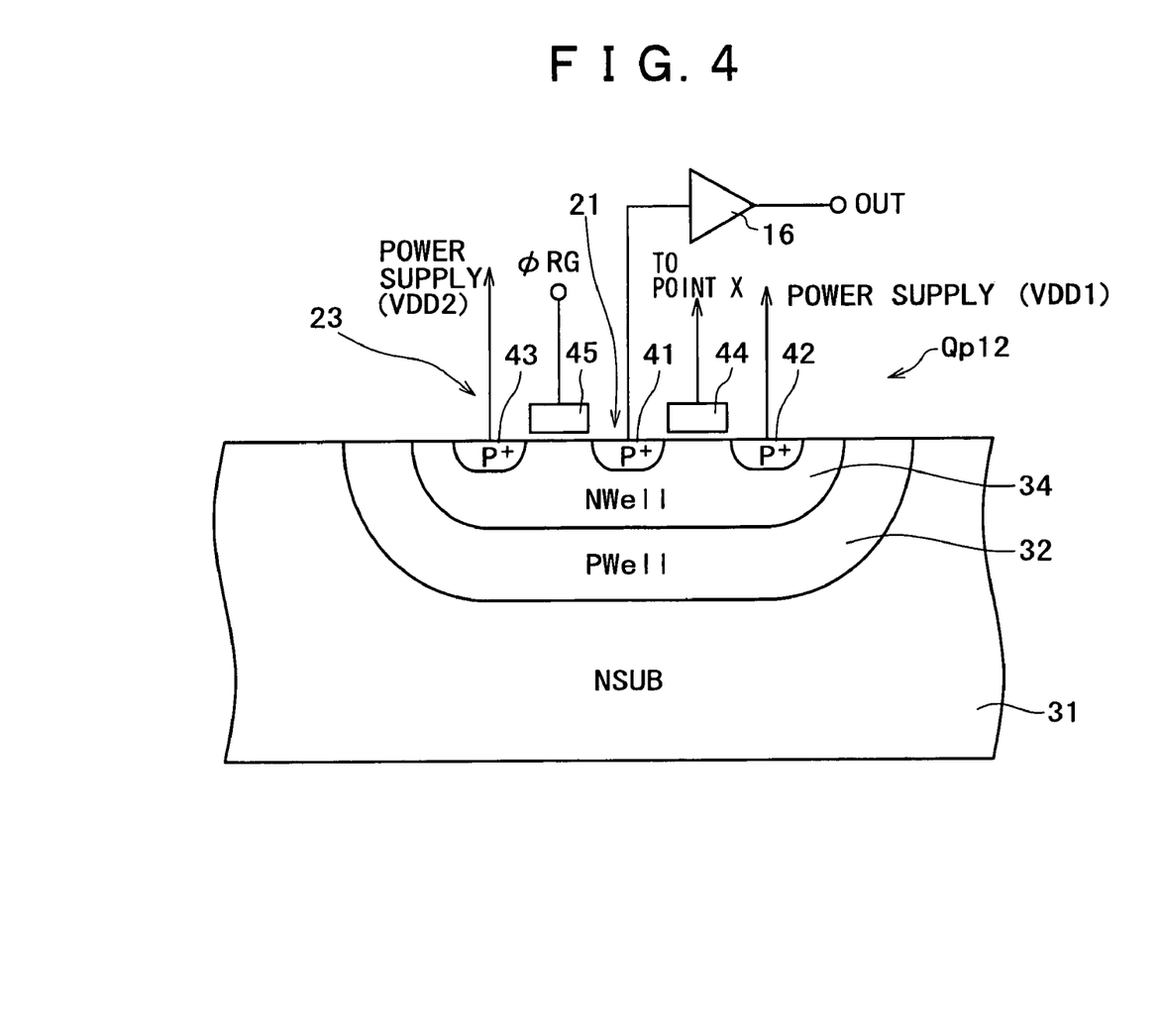
FIG. 4 is a sectional view showing the structure of an area B enclosed with a dotted line in FIG. 2.

FIG. 4 is a sectional view showing the structure of an area B enclosed with a dotted line in FIG. 2, i.e., the MOS transistor QP12 constituting the current mirror circuit 22, the floating diffusion region 21 and the reset transistor 23. In this diagram, any component parts corresponding to those in FIG. 3 are denoted by like reference numerals or symbols.

In FIG. 4, an N type well region 34 is formed in the surface layer of the P type well region 32 formed on the N type semiconductor substrate 31, for example. A P+ type impurity region 41 to serve as the floating diffusion region 21, a P+ type impurity region 42 to serve as the source region of the MOS transistor QP12, and a P+ type impurity region 43 to serve as the drain region of the reset transistor (Pch MOS transistor) 23 are formed on the surface layer of this N type well region 34. The P+ type impurity region 41 is commonized with the drain region of the MOS transistor QP12 and the source region of the reset transistor 23.

The P+ type impurity region 42 constitutes the Pch MOS transistor Qp12 in combination with the P+ type impurity region 41 serving as the drain region and also with a gate electrode 44 that is formed via a gate insulator film (not shown) over the channel region between the P+ type impurity region 41 and the P+ type impurity region 42. The P+ type impurity region 43 constitutes the reset transistor (Pch MOS transistor) 23 in combination with the P+ type impurity region 41 serving as the source region and also with a gate electrode 45 that is formed via a gate insulator film (not shown) over the channel region between the P+ type impurity region 41 and the P+ type impurity region 43.

Next, the operation of the charge detector 15 having the above structure will be described below with reference to FIGS. 2 to 4.

First, the signal charge (here, electron) transferred from the horizontal CCD 14 is turned back by the current mirror circuit 22 consisting of the Pch MOS transistors Qp11 and Qp12. As obvious from FIG. 3, the transferred electron flows as a signal current by recoupling to a positive hole caused to flow from the Pch MOS transistor Qp11 via the metal wiring 36 and so forth.

Here, a supply voltage VDD1 of 15 V or so, which is sufficiently higher than the potential (e.g., 10 V or so) of the horizontal CCD 14, is applied to each source of the Pch MOS transistors Qp11 and Qp12 in such a manner that the electron transferred from the horizontal CCD 14 can be re-coupled to the positive hole. The current turned back by the current mirror circuit 22, i.e., the signal charge corresponding to the quantity of electric charge for the signal charge transferred from the horizontal CCD 14, is supplied to the floating diffusion region 21 formed of the P+ type impurity region 41 and then is stored therein while being converted into a signal voltage by a capacitance Cfd of the floating diffusion region 21. And, after the converted signal voltage is outputted subsequently to impedance conversion by the output buffer 16, the floating diffusion region 21 is reset to a low supply voltage of 5 V or so which is equal to the supply voltage VDD2 of the output buffer 16.

The floating diffusion region 21 is commonized with the drain region of the Pch MOS transistor Qp12 constituting the current mirror circuit 22 and also with the source region of the Pch MOS transistor constituting the reset transistor 23. In this manner, the floating diffusion region 21 is composed of the impurity of the same conduction type as that of the drain region of the Pch MOS transistor Qp12 constituting the current mirror circuit 22 and also that of the source region of the Pch MOS transistor constituting the reset transistor 23, and it is commonized with such impurity regions, whereby a channel stop portion for mutually separating the respective regions is no longer needed to realize consequently a more minute structure of the floating diffusion region 21 correspondingly thereto.

Here, a conversion efficiency η, which represents the signal voltage value obtained by converting one electron, is expressed as $$\eta \approx q/Cfd$$

where q denotes the charge quantity of one electron. Therefore, the conversion efficiency η can be improved by forming a more minute structure of the floating diffusion region 21.

As shown in FIG. 2, a parasitic capacitance Cp is incidental to the input terminal of the current mirror circuit 22, i.e., to the gate of the MOS transistor Qp11. However, since the operating points of the Pch MOS transistors Qp11 and Qp12 constituting the current mirror circuit 22 in particular are so set that these transistors operate in the respective subthreshold regions, substantially no potential change occurs at a point X despite a great change of the signal current, i.e., the gate potential in the MOS transistor Qp11 remains almost unchanged. Consequently, with regard to the conversion efficiency or the frequency characteristic, there occurs nearly none of the deterioration that may otherwise be caused by the parasitic capacitance Cp at the time of converting the signal charge into a signal voltage.

As described above, in the CCD solid-state image pickup device of this embodiment, a current source for supplying a signal charge corresponding to the quantity of electric charge for the signal charge transferred from the horizontal CCD 14 is disposed between the output stage of the horizontal CCD 14 and the floating diffusion region 21, so that the current mirror circuit 22 functioning as the current source acts to potentially separate the output stage of the horizontal CCD 14 from the floating diffusion region 21. Accordingly, the reset voltage for the floating diffusion region 21, i.e., the second supply voltage VDD2, can be set independently of the potential (e.g., 10 V or so) of the horizontal CCD 14.

More specifically, a supply voltage sufficiently higher than the potential of the horizontal CCD 14, i.e., the supply voltage VDD1 of 15 V or so, needs to be applied to each source of the MOS transistors QP11 and Qp12 constituting the current mirror circuit 22, but the output stage of the horizontal CCD 14 and the floating diffusion region 21 are potentially separated from each other by the current mirror circuit 22, so that the voltage for resetting the floating diffusion region 21, i.e., the second supply voltage VDD2 applied to the drain of the reset transistor 23, is settable to be lower than the first supply voltage VDD1, hence lowering the reset voltage to eventually attain a reduction of the power consumption in the CCD solid-state image pickup device without deteriorating the conversion efficiency or the frequency characteristic.

Particularly due to the use of the current mirror circuit 22 as a current source interposed between the output stage of the horizontal CCD 14 and the floating diffusion region 21, a signal charge proportional to the quantity of electric charge for the signal charge transferred from the horizontal CCD 14 can be fed into the floating diffusion region 21, thereby outputting the signal voltage of the value corresponding exactly to the quantity of the signal charge obtained in the light receiving element 12 through photoelectric conversion.

Although the parasitic capacitance Cp is incidental to the input terminal of the current mirror circuit 22, since the operating points of the Pch MOS transistors Qp11 and Qp12 constituting the current mirror circuit 22 in particular are set so that these two transistors operate in the respective subthreshold regions, the potential at the point X is not changed substantially despite any great change of the signal current, hence causing nearly no deterioration of the conversion efficiency η or that of the frequency characteristic derived from the parasitic capacitance Cp.

Further, as the current mirror circuit 22 is made up of the Pch MOS transistors Qp11 and Qp12, it becomes possible to simplify the process of manufacturing a CCD solid-state image pickup device in comparison with the known case of using bipolar transistors. However, the transistors are not limited to MOS ones alone, and bipolar transistors may also be employed instead of the Pch MOS transistors Qp11 and Qp12. In the case of employing bipolar transistors, the manufacturing process is somewhat complicated in comparison with the case of employing MOS transistors, but a CCD solid-state image pickup device of superior characteristics is attainable.

Figure 5:
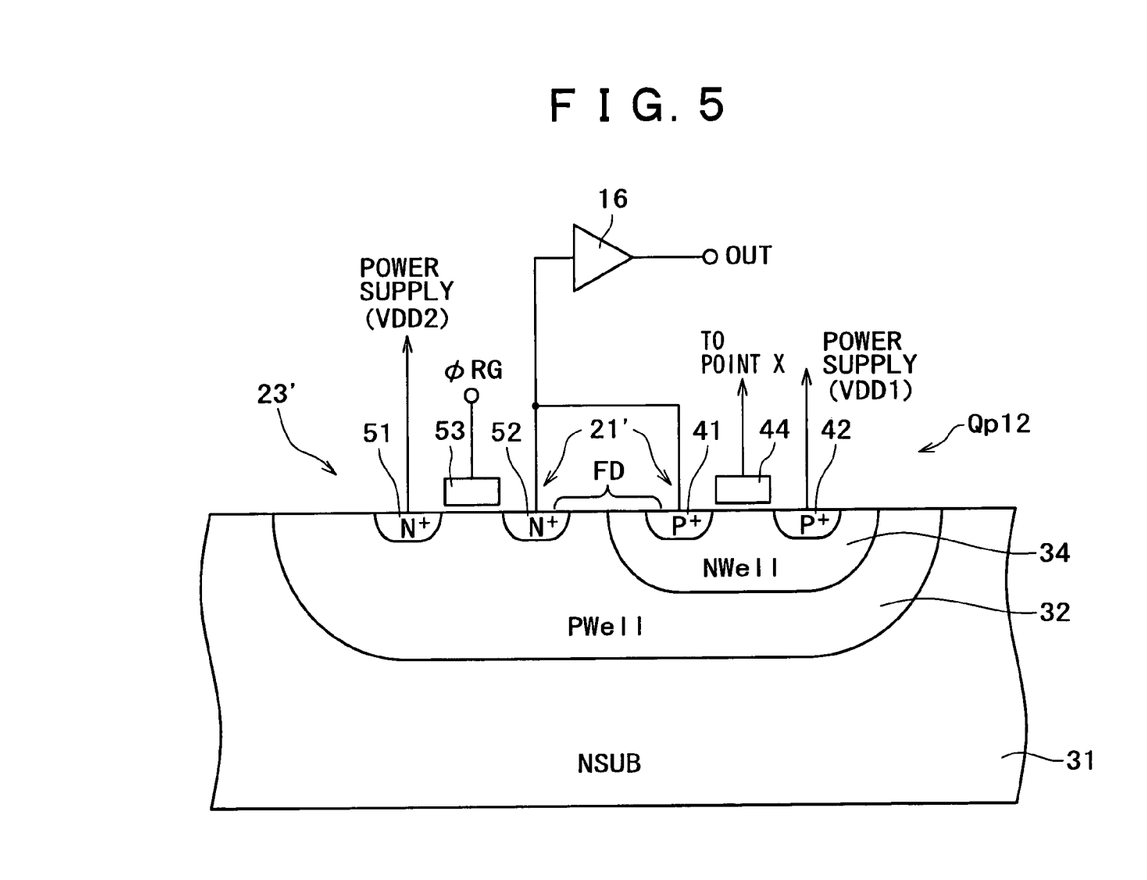
FIG. 5 is a sectional view showing the structure where a reset transistor consists of an Nch MOS transistor.

In this circuit example, the reset transistor 23 consists of a Pch MOS transistor. However, it may consist of an Nch MOS transistor as well. FIG. 5 shows a sectional structure in the case of using an Nch MOS transistor as the reset transistor 23. In FIG. 5, any component parts corresponding to those in FIG. 4 are denoted by like reference numerals or symbols.

In FIG. 5, an N+ type impurity region 51 to serve as a drain region and an N+ type impurity region 52 to serve as a source region are formed in the surface layer of a P well region 32 formed on an N type semiconductor substrate 31, for example. These regions 51 and 52 constitute a reset transistor 23', which consists of an Nch MOS transistor, in combination with a gate electrode 53 formed via a gate insulator film (not shown) over a channel region between the two impurity regions 51 and 52. In this case, a floating diffusion region 21' is divided into an N+ type impurity region 52 and a P+ type impurity region 41.

Figure 6:
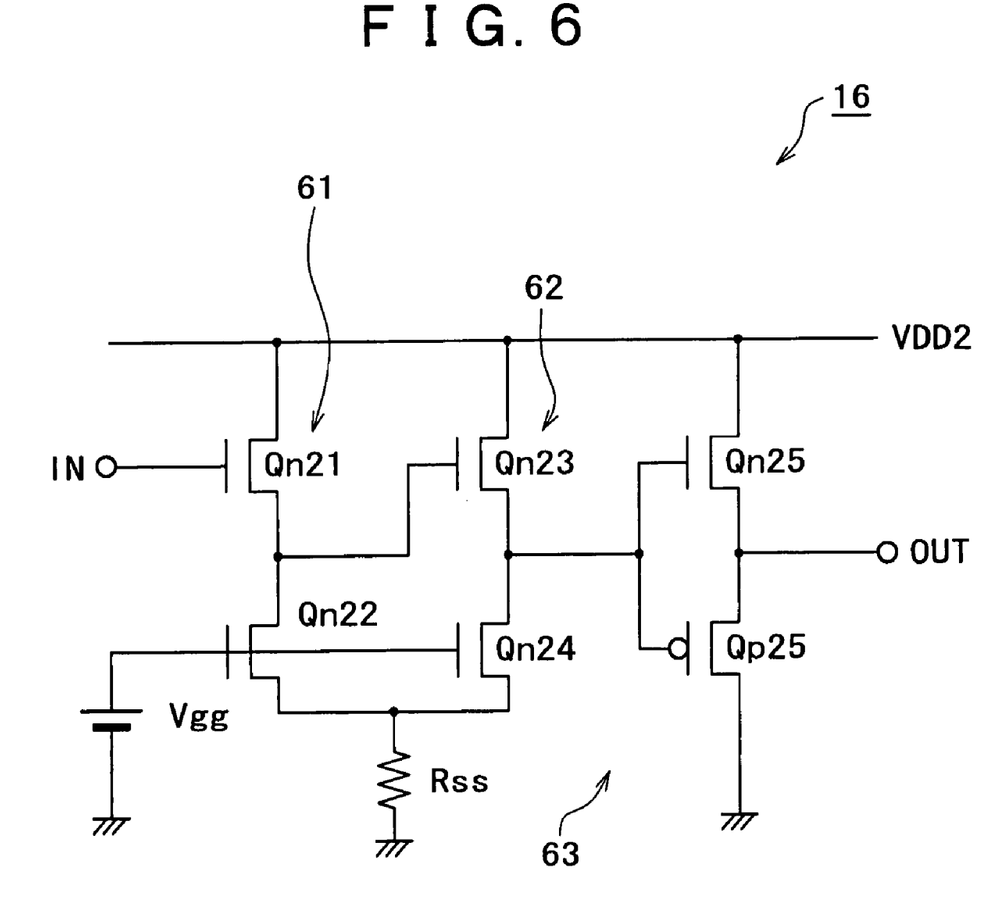
FIG. 6 is a circuit diagram showing an example of a concrete structure of an output buffer.

FIG. 6 is a circuit diagram showing a concrete structural example of the output buffer 16. In the output buffer 16 of this example, source follower circuits are cascade-connected in three stages, wherein the third-stage source follower circuit consists of a push-pull circuit.

In FIG. 6, the first-stage source follower circuit 61 consists of an Nch driving MOS transistor Qn21 and an Nch load MOS transistor Qn22. The gate of the MOS transistor Qn21 is connected to the floating diffusion region 21 (see FIG. 2, etc.), and the supply voltage VDD2 is applied to the drain thereof. The drain of the MOS transistor Qn22 is connected to the source of the driving MOS transistor Qn21, while the source thereof is grounded via a resistor Rss, and a fixed bias voltage Vgg is applied to the gate thereof.

The second-stage source follower circuit 62 consists of an Nch driving MOS transistor Qn23 and an Nch load MOS transistor Qn24. The gate of the MOS transistor Qn23 is connected to the output end of the first-stage source follower circuit 61, i.e., to the source of the MOS transistor Qn21, and the supply voltage VDD2 is applied to the drain thereof. The drain of the MOS transistor Qn24 is connected to the source of the driving MOS transistor Qn23, while the source thereof is grounded via the resistor Rss, and the fixed bias voltage Vgg is applied to the gate thereof.

The final-stage source follower circuit 63 consists of an Nch MOS transistor Qn25 and a Pch MOS transistor Qp25. The gate of the MOS transistor Qn25 is connected to the output end of the second-stage source follower circuit 62, i.e., to the source of the MOS transistor Qn23, and the supply voltage VDD2 is applied to the drain thereof. The gate and source of the MOS transistor Qp25 are connected in common to the gate and source of the MOS transistors Qn25, respectively, and the drain thereof is grounded. The final-stage source follower circuit 63 is formed into a push-pull circuit configuration to perform a push-pull operation in response to the output signal of the second-stage source follower circuit 62.

In the first-stage and second-stage source follower circuits 61 and 62, an enhancement mode transistor is used as the driving MOS transistor Qn21 in the first-stage source follower circuit 61, and a depletion mode transistor is used as the driving MOS transistor Qn23 in the second-stage source follower circuit 62 and also as each of the load MOS transistors Qn22 and Qn24. And, in the third-stage source follower circuit 63, a depletion mode transistor is used as each of the MOS transistors Qn25 and Qp25 for enabling the source follower circuit 63 to perform an idling operation, i.e., for causing an idling current flow of, e.g., 10 mA or so in a steady state.

In the output buffer 16 of the above structure, the Nch MOS transistor Qn25 is turned on when an input signal to the final stage has risen, while the Pch MOS transistor Qp25 is substantially turned off. At this time, since the Pch MOS transistor Qp25 is in depletion mode, it is not turned off completely and some current still flows therein. Consequently, the Nch MOS transistor Qn25 functions as a driving transistor for the final-stage source follower circuit 63, whereby the output side (load capacitance) is charged through the MOS transistor Qn25. In this case, the Pch MOS transistor Qp25 is substantially turned off, so that the load capacitance can be charged quickly to thereby increase the rise speed.

Next, when the input signal to the final stage has fallen to the contrary, the Nch MOS transistor Qn25 is substantially turned off, while the Pch MOS transistor Qp25 is turned on. At this time, since the Nch MOS transistor Qn25 is in depletion mode, it is not turned off completely. Therefore, the Pch MOS transistor Qp25 functions as a driving transistor for the final-stage source follower circuit 63, whereby the load capacitance is discharged through the MOS transistor Qp25. Thus, the load capacitance can be discharged through the Pch MOS transistor Qp25, which is turned on to be in its saturation state, hence increasing the fall speed.

As described above, in the output buffer 16 where the source follower circuits of multiple stages are cascade-connected, the final-stage source follower circuit 63 is formed into a push-pull circuit configuration, so that at the rise time of the input signal to the final stage, the Nch MOS transistor Qn25 is enabled to function as a source follower driving transistor, and at the fall time of the input signal, the Pch MOS transistor Qp25 is enabled to function as a source follower driving transistor. Therefore, it becomes possible to render the fall speed higher by raising the mutual conductance gm of the Pch MOS transistor Qp25 without increasing the current consumption in particular.

In other words, the current consumption can be reduced in case the response characteristic at the fall of the input signal is the same as the one known in the related art. Therefore, due to the final stage employing the output buffer 16 of a push-pull circuit configuration, it is possible to achieve a further reduction of the power consumption in the CCD solid-state image pickup device. In addition, since depletion mode transistors are used as the MOS transistors Qn25 and Qp25 which constitute the final-stage source follower circuit 63, a minimum idling current is kept flowing in the final-stage source follower circuit 63 at any time during the operation, hence preventing deterioration of the linearity.

Second Circuit Example

Figure 7:
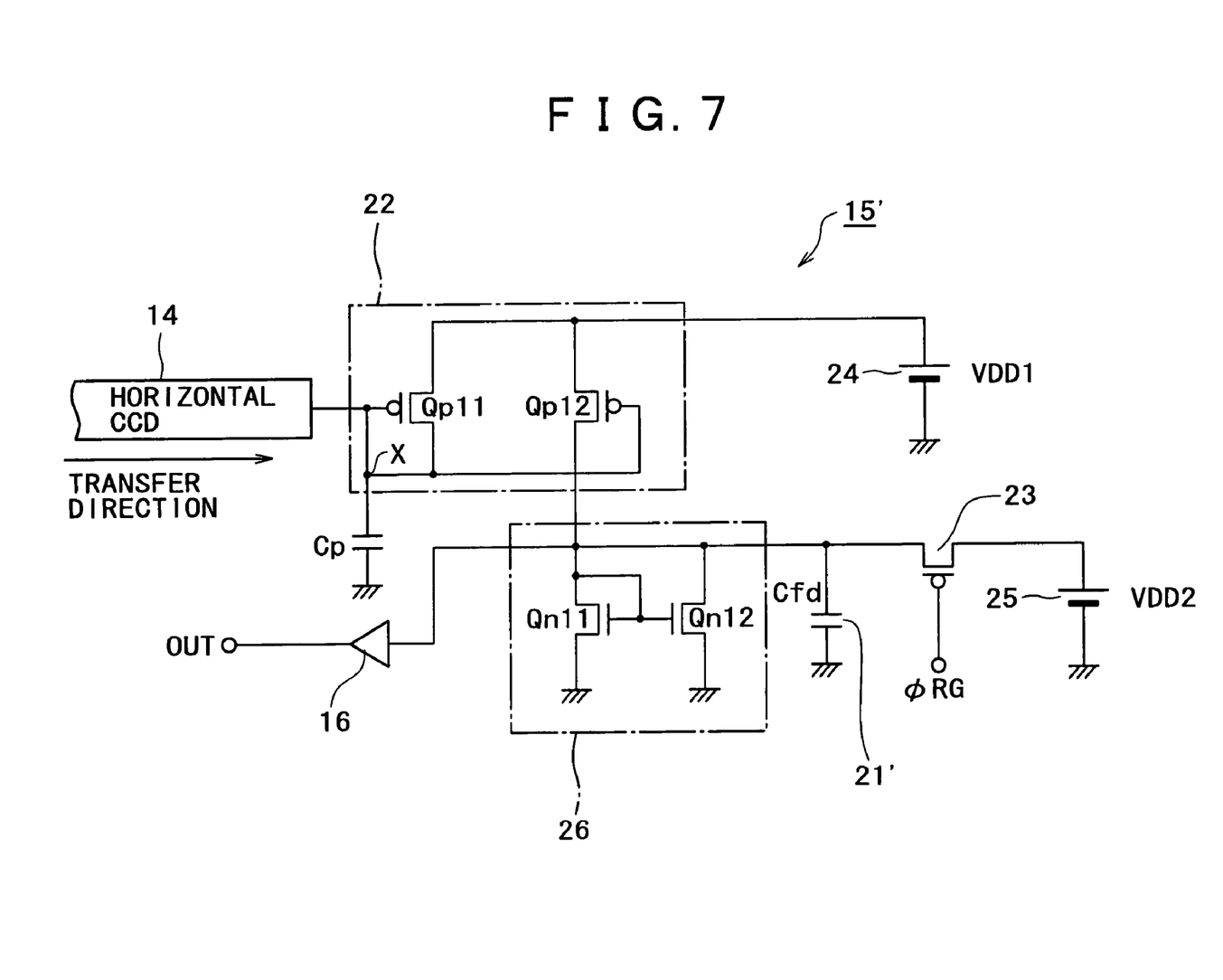
FIG. 7 is a circuit diagram showing a second circuit example with regard to a charge detector and peripheral portions thereof.

FIG. 7 is a circuit diagram showing a second circuit example with regard to a charge detector 15 and its peripheral portions. In this diagram, any component parts corresponding to those in FIG. 2 are denoted by like reference numerals or symbols.

In FIG. 7, a charge detector 15' in this circuit example is so composed that a second current mirror circuit 26 is interposed between a current mirror circuit 22 and a floating diffusion region 21', and a reset transistor 23' consists of an Nch MOS transistor. Any other structure is the same as that of the charge detector 15 in the first circuit example.

The current mirror circuit 26 consists of an Nch MOS transistor Qn11 and an Nch MOS transistor Qn12. The gate and drain of the MOS transistor Qn11 are connected in common to the drain of a MOS transistor Qp12, and the source thereof is grounded. The gate of the MOS transistor Qn12 is connected in common to the gate of the MOS transistor Qn11, while the source thereof is grounded, and the drain thereof is connected to the floating diffusion region 21'. In this current mirror circuit 26, the signal charge turned back by the current mirror circuit 22 is further turned back and supplied to the floating diffusion region 21'.

Figure 8:
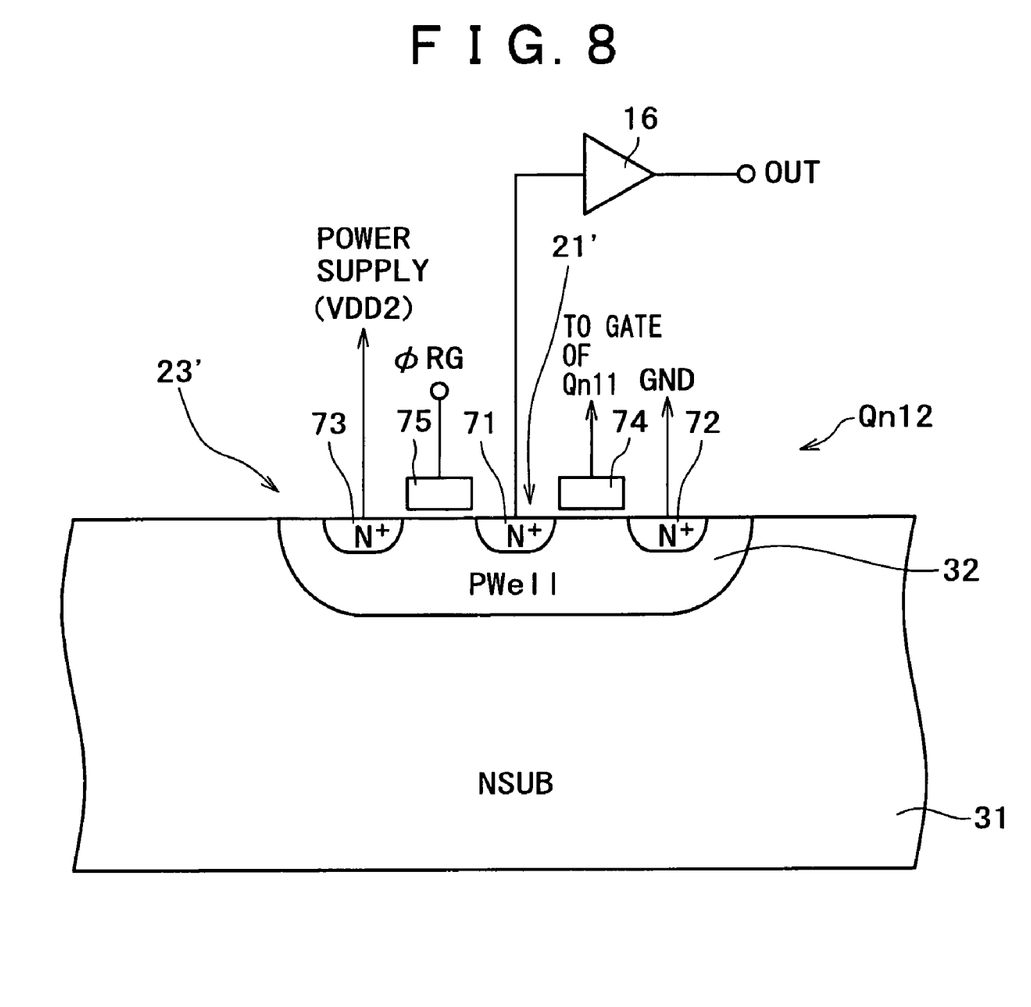
FIG. 8 is a sectional view showing the structure of a MOS transistor constituting a current mirror circuit, a floating diffusion region and a reset transistor in the second circuit example.

FIG. 8 is a sectional view showing the structure of the MOS transistor Qn12 constituting the current mirror circuit 26 in FIG. 7 and also the floating diffusion region 21' and the reset transistor 23' therein. In this diagram, any component parts corresponding to those in FIG. 4 are denoted by like reference numerals or symbols.

In FIG. 8, an N+ type impurity region 71 to serve as the floating diffusion region 21', an N+ type impurity region 72 to serve as the source region of the MOS transistor Qn12, and an N+ type impurity region 73 to serve as the drain region of the reset transistor (Nch MOS transistor) 23' are formed in the surface layer of a P type well region 32 on an N type semiconductor substrate 31, for example. The N+ type impurity region 71 is commonized with the drain region of the MOS transistor Qn12 and also with the source region of the reset transistor 23'.

The N+ type impurity region 72 constitutes the Nch MOS transistor Qn12 in combination with the N+ type impurity region 71 to serve as a drain region and a gate electrode 74 that is formed via a gate insulator film (not shown) over the channel region between the N+ type impurity region 71 and the N+ type impurity region 72. The N+ type impurity region 73 constitutes the reset transistor 23', which consists of an Nch MOS transistor, in combination with the N+ type impurity region 71 to serve as a source region and a gate electrode 75 formed via a gate insulator film (not shown) over the channel region between the N+ type impurity region 71 and the N+ type impurity region 73.

As described above, in the charge detector 15' according to the second circuit example, the current mirror circuit 26 consisting of an Nch MOS transistor is interposed between the current mirror circuit 22 and the floating diffusion region 21', and the reset transistor 23' consists of an Nch MOS transistor. Therefore, as obvious from FIG. 8, the MOS transistor Qn12 constituting the current mirror circuit 26 and the MOS transistor constituting the reset transistor 23' can be formed within the P type well 32.

Consequently, as compared with the charge detector 15 in the first circuit example, the charge detector 15' in the second circuit example is more advantageous in the point that, as obvious from a comparison between FIGS. 4 and 8, the plane area that covers the floating diffusion region 21', the reset transistor 23' and the current mirror circuit 26 can be made dimensionally smaller due to the non-necessity of forming the N type well region 34 within the P type well region 32. Therefore, corresponding to such a dimensional reduction, it becomes possible to shorten the length of the wiring which links the floating diffusion region 21' to the output buffer 16.

Since the length of the wiring for linking the floating diffusion region 21' to the output buffer 16 can thus be shortened, the parasitic capacitance incidental to the wiring is diminished. This parasitic capacitance appears in the form of an addition to the capacitance Cfd of the floating diffusion region 21' and exerts some harmful effect on the conversion efficiency. Consequently, such a diminution of the parasitic capacitance incidental to the link wiring between the floating diffusion region 21' and the output buffer 16 signifies a greater improvement of the conversion efficiency than in the foregoing case of the charge detector 15 according to the first circuit example.

Further, the floating diffusion region 21' is composed of the impurity of the same conduction type as that of the drain region of the MOS transistor Qn12 constituting the current mirror circuit 26 and also that of the source region of the MOS transistor constituting the reset transistor 23', and these regions are commonized with one another, so that a channel stop portion for mutually separating these regions is not necessary as in the first circuit example, hence realizing a more minute structure of the floating diffusion region 21' to eventually improve the conversion efficiency.

Although the reset transistor 23' used in this circuit example consists of an Nch MOS transistor, the reset transistor 23' may consist of a Pch MOS transistor as well.

Further regarding the embodiment mentioned above, an explanation has been given of an exemplary case of applying the present invention to a CCD solid-state image pickup device of a horizontal CCD system wherein a signal charge obtained by each pixel through photoelectric conversion is transferred vertically by the vertical CCD, transferred horizontally by the horizontal CCD, and outputted after being converted into a corresponding signal voltage by the charge detector disposed posterior to the horizontal CCD. However, the present invention is not limited to this example alone. That is, the present invention is also applicable to the output part disposed posterior to each vertical CCD in a CCD solid-state image pickup device of a horizontal scan system wherein a signal charge obtained by each pixel through photoelectric conversion is transferred vertically by the vertical CCD, and then each signal voltage obtained through voltage conversion in a charge detector disposed posterior to each vertical CCD is read out sequentially by horizontal scanning.

Having described a preferred embodiment of the present invention with reference to the accompanying drawings, it is intended that the invention be not limited to the examples described above. It is apparent that various changes and modifications may be made within meets and bounds of the claims by those skilled in the art, and it is understood that all such changes and modifications are embraced within the technical scope of the present invention.

What is claimed is:

1. A solid-state image pickup device comprising:
   a charge transferrer for transferring a signal charge obtained through photoelectric conversion;
   a floating diffusion region;
   reset means for resetting a potential of said floating diffusion region; and
   a current source for supplying a signal charge, which corresponds to a quantity of the signal charge transferred by said charge transferrer, to said floating diffusion region, wherein said current source is made up of a current mirror circuit, and
   wherein said floating diffusion region is composed of an impurity of a same conduction type as that of a transistor constituting said reset means and that of a transistor constituting said current mirror circuit, and said floating diffusion region is commonized with said transistors of the same conduction type.

2. The solid-state image pickup device according to claim 1, wherein said current mirror circuit consists of a MOS transistor.

3. The solid-state image pickup device according to claim 2, wherein said MOS transistor operates in a sub-threshold region thereof.

4. The solid-state image pickup device according to claim 1, wherein said current mirror circuit consists of a bipolar transistor.

5. A solid-state image pickup device comprising:
   a charge transferrer for transferring a signal charge obtained through photoelectric conversion;
   a floating diffusion region;
   reset means for resetting a potential of said floating diffusion region; and
   a current source for supplying a signal charge, which corresponds to a quantity of the signal charge transferred by said charge transferrer, to said floating diffusion region, wherein said current source is made up of a current mirror circuit, and wherein said current mirror circuit comprises a first current mirror circuit which consists of a Pch MOS transistor and outputs a signal charge corresponding to the quantity of the signal charge transferred by said charge transferrer, and a second current mirror circuit which consists of an Nch MOS transistor and supplies, to said floating diffusion region, a signal charge corresponding to the quantity of the signal charge outputted from said first current mirror circuit.

6. The solid-state image pickup device according to claim 5, wherein said floating diffusion region is composed of an impurity of a same conduction type as that of a transistor constituting said reset means and that of a transistor constituting said second current mirror circuit, and said floating diffusion region is commonized with said transistors of the same conduction type.

7. The solid-state image pickup device according to claim 5, wherein said current mirror circuit consists of a MOS transistor.

8. The solid-state image pickup device according to claim 7, wherein said MOS transistor operates in a sub-threshold region thereof.

9. The solid-state image pickup device according to claim 5, wherein said current mirror circuit consists of a bipolar transistor.

* * * * *